(12) United States Patent
Finn

(10) Patent No.: US 10,681,386 B1
(45) Date of Patent: Jun. 9, 2020

(54) INSERTION OF END OF FRAME INDICATORS IN STREAMING VIDEO PROTOCOLS

(71) Applicant: L3 Technologies, Inc., New York, NY (US)

(72) Inventor: Gregory A. Finn, Salt Lake City, UT (US)

(73) Assignee: L3 Technologies, Inc., New York, NY (US)

( * ) Notice: Subject to any disclaimer, the term of this patent is extended or adjusted under 35 U.S.C. 154(b) by 141 days.

(21) Appl. No.: 15/478,069

(22) Filed: Apr. 3, 2017

(51) Int. Cl.
*H04N 19/87* (2014.01)
*H04L 29/06* (2006.01)
*H04N 21/234* (2011.01)
*H04N 19/46* (2014.01)
*H04N 19/44* (2014.01)

(52) U.S. Cl.
CPC .......... *H04N 19/87* (2014.11); *H04L 65/608* (2013.01); *H04N 19/44* (2014.11); *H04N 19/46* (2014.11); *H04N 21/234* (2013.01)

(58) Field of Classification Search
USPC ..................................... 375/240.25
See application file for complete search history.

(56) References Cited

U.S. PATENT DOCUMENTS

| | | | |
|---|---|---|---|
| 6,430,159 B1 | 8/2002 | Wan | |
| 6,826,183 B1 * | 11/2004 | Itoi | G11B 20/00007 370/392 |
| 7,259,758 B2 | 8/2007 | Yee | |
| 8,782,261 B1 * | 7/2014 | Rodriguez | H04H 60/65 709/217 |
| 2002/0071491 A1 * | 6/2002 | Sugiyama | H04N 19/00 375/240.23 |
| 2003/0081938 A1 * | 5/2003 | Nishimura | G11B 27/034 386/279 |
| 2005/0013586 A1 * | 1/2005 | Bhatia | H04N 5/4401 386/232 |
| 2006/0093225 A1 * | 5/2006 | Bhatia | H04N 19/61 382/233 |
| 2006/0133429 A1 * | 6/2006 | Seo | H04N 21/434 370/535 |
| 2007/0028026 A1 * | 2/2007 | Yeh | G11B 27/034 711/4 |
| 2007/0268965 A1 * | 11/2007 | Alfonso | H04N 7/0105 375/240.01 |

(Continued)

*Primary Examiner* — Behrooz M Senfi
(74) *Attorney, Agent, or Firm* — Workman Nydegger

(57) ABSTRACT

Adding an end-of-frame indicator to streaming video data at video frame granularity. The method includes obtaining a set of data for a video frame in an elementary stream of video data. The method further includes identifying that the set of data for the video frame is complete. As a result of identifying that the set of data for the video frame is complete, an end-of-frame indicator is added to the set of data in a transport layer of a multiplexed media stream that includes the end-of-frame indicator in the transport layer and the set of video data in the elementary stream layer of the multiplexed media stream. The multiplexed media stream is transmitted including the set of data in the elementary stream layer of the video stream and the end-of-frame indicator in the transport layer of the video stream multiplexed together.

20 Claims, 3 Drawing Sheets

(56) References Cited

U.S. PATENT DOCUMENTS

| | | | |
|---|---|---|---|
| 2008/0056682 A1* | 3/2008 | Minnick | G11B 27/005 386/329 |
| 2008/0115175 A1* | 5/2008 | Rodriguez | H04N 5/76 725/87 |
| 2008/0292263 A1* | 11/2008 | Van Gestel | G11B 27/005 386/351 |
| 2009/0041115 A1* | 2/2009 | Ramesh | H04N 21/235 375/240.01 |
| 2009/0052541 A1* | 2/2009 | Kang | H03M 13/2915 375/240.24 |
| 2009/0148131 A1* | 6/2009 | Akgul | H04N 21/2368 386/355 |
| 2017/0111412 A1* | 4/2017 | Rogers | H04L 65/4069 |

* cited by examiner

INSERTION OF END OF FRAME INDICATORS IN STREAMING VIDEO PROTOCOLS

BACKGROUND

Background and Relevant Art

A video elementary stream is a stream of video data that is output from a video encoder. Thus, a video elementary stream will typically include encoded frames of video data, where each frame represents data for an image in a video stream. The frames are compressed in the sense that they are encoded into a particular format prior to saving to file and/or network streaming, such as by using compression algorithms like those identified by MPEG.

As noted, a stream of video data in an elementary stream is typically divided by video frames. In particular, an encoded video frame includes data that represents an image that when decoded and sequentially displayed with other decoded images from the elementary stream creates the illusion of motion to a user.

Elementary streams are typically defined by a video compression protocol such as those defined by MPEG. Elementary stream data represents the lowest layer of conversion of uncompressed video images to a compressed frame format and is typically streamed at what is known as the elementary stream layer of such protocols. The stream often includes bursts of video data (and corresponding lulls in data) wherein each burst typically corresponds to a video frame. This is especially true in live video streaming where a video frame is captured in an uncompressed video frame buffer, encoded using some compression algorithm into a compressed frame buffer, and streamed at a video frame granularity such that all available data for a video frame is captured, encoded, and streamed as a unit.

When a video stream encoded as a video elementary stream is received, the video will need to be decoded to some form of uncompressed video data that can be output to a user on a display device. Typically, this will require, for each video frame, obtaining all of the available data for the frame in a frame buffer, and decoding (such as by decompression) the video data in the frame buffer to create an uncompressed image that can be displayed to a user on a display device, in a sequential fashion with other uncompressed images, for video frames in the video stream.

The protocol definition for video elementary streams specifies that a short, easily parsed byte sequence is added to a burst of video elementary stream data to identify the start of a frame with a start-of-frame (SOF) indicator. The end of a frame is typically identified by receiving the SOF indicator for the next video frame. However, as noted above, data for frames is streamed at video frame granularity in a bursting fashion such that there is often a certain amount of time (referred to herein as an inter-frame interval) that elapses between the actual end of a frame being received and data (i.e., a SOF indicator) for the start of the next frame. Thus, pre-parsing for just start-of-frame (SOF) indicators requires waiting for arrival of the next video frame to signify the completion of the current video frame being processed. Decoding of a video frame buffer cannot begin until the start of the next frame buffer is received. One problem with this method for use in live video applications is that it incurs additional latency by up to one inter-frame interval, which for NTSC video is 33 milliseconds (ms). For systems with a requirement of, for example, 100 ms end-to-end video latency, where one end is responsible for video encoding and the other for video decoding, pre-parsing NTSC video using the SOF indicators alone can consume up to one third of the entire latency allowance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of adding an end-of-frame indicator to streaming video data at video frame granularity. The method includes obtaining a set of data for a video frame in an elementary stream. The method further includes identifying that the set of data for the video frame is complete. As a result of identifying that the set of data for the video frame is complete, an end-of-frame indicator is added to the set of data in a transport layer of a multiplexed media stream that includes the end-of-frame indicator in the transport layer and the set of video data in the elementary stream layer of the multiplexed media stream. The multiplexed media stream is transmitted including the set of data in the video elementary stream layer and the end-of-frame indicator in the transport layer multiplexed together.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments of the invention illustrated herein use custom header content in streaming video protocols, and in particular, a transport stream layer, to indicate the end of a video frame buffer. This allows for processing of a video stream without needing to wait for the beginning of the next frame buffer to begin decoding a frame. The end-of-frame indicator is inserted into a video stream multiplex by a video encoder pipeline prior to transmission, and makes it possible for a video decoder pipeline receiving the stream to begin the decode and subsequent display operations sooner for each frame. The result is a decrease in end-to-end latency of up to one inter-frame interval, which is 33 milliseconds in the case of NTSC video.

Figure 1:
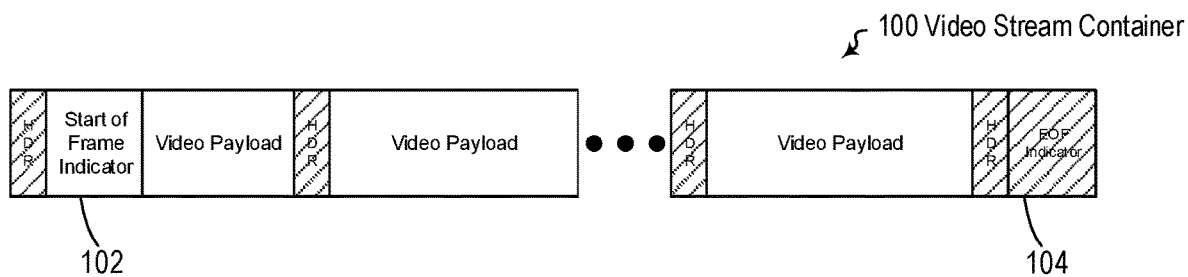
FIG. 1 illustrates a video stream container with an end-of-frame indicator in the transport stream layer of the video stream container.

An example is illustrated in FIG. 1. FIG. 1 illustrates a video stream container 100. The video stream container 100 for a given video frame, in this example, includes an elementary video stream layer (as denoted by the non-cross hatched portions) and a transport stream layer (denoted by the cross hatched portions). A start-of-frame (SOF) indicator is included in the elementary stream layer while the end-of-frame indicator is included in the transport stream layer. While in this example, the video stream container is shown as including elementary video data (that is video data without audio or other components) and the SOF indicator in the elementary video stream layer and other header data, including an end-of-frame indicator 104, in the transport stream layer, it should be appreciated that in other embodiments, the video stream container 100 may include elementary audio layers, or other data that has been multiplexed into the video stream container 100.

The following now illustrates examples of transmit and receive hardware that may be implemented in some embodiments of the invention.

Figure 2:
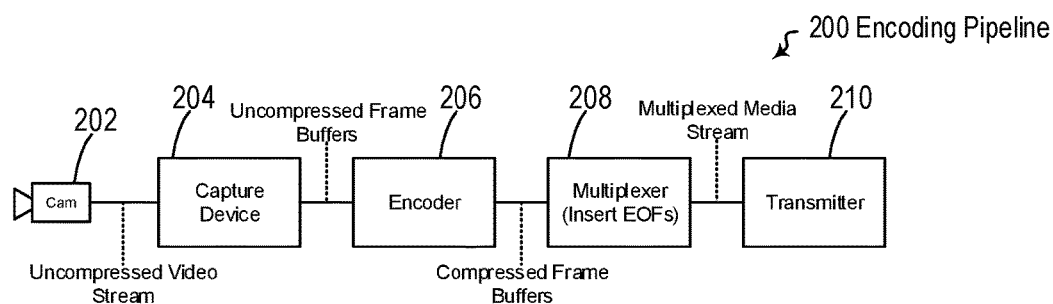
FIG. 2 illustrates an encoding pipeline for adding end-of-frame indicators into the transport stream layer of a multiplexed media stream.

Referring now to FIG. 2, an example of transmit hardware in an encoding pipeline 200 is illustrated. The example illustrated in FIG. 2 is an example system for streaming live video. However, it should be appreciated that in other embodiments, previously recorded video may be streamed. Note that as used herein, video is defined as a collection of images that show motion when displayed sequentially.

FIG. 2 illustrates a camera 202. The camera 202 may be configured to capture video images and to create an uncompressed video stream. While FIG. 2 illustrates a camera 202, it should be appreciated that other hardware can be used to create an uncompressed video stream. For example, in some embodiments, sensors that do not operate in the visual spectrum may be used to capture image data. For example, radar or other radio wave detectors may be used to generate uncompressed image and video streams. Additionally, or alternatively, other types of cameras such as thermal cameras may be used to generate uncompressed video stream data.

The uncompressed video stream is provided to a capture device 204. The capture device 204 is able to group individual frame data into uncompressed frame buffers and to provide uncompressed frame buffers for individual frames to an encoder 206. The encoder 206 is configured to compress frame data according to a compression algorithm on a frame basis into compressed frame buffers. For example, such compression algorithms may include those defined by MPEG or other compression algorithms. Uncompressed video stream data is typically compressed on a frame by frame basis. That is, each frame in an uncompressed video stream is compressed by an encoder in a frame unit such as a compressed frame buffer as illustrated in FIG. 2. The encoder 206 will also add the SOF indicator to the compressed frame buffer.

The compressed frame buffers are provided to a multiplexer 208. The multiplexer 208 is configured to multiplex various streams of elementary data, such as elementary video data, elementary audio data, etc. The multiplexer 208 can further add additional data to a video stream in the creation of a multiplexed media stream. In the example illustrated herein, the multiplexer 208 inserts an end-of-frame indicator into the multiplexed media stream. The multiplexed media stream is provided to a transmitter 210 wherein it can be provided to a channel and delivered to a user at receiver hardware. For example, the multiplexed multimedia stream can be provided to the receiver hardware illustrated in FIG. 3.

The transmitter 210 in some embodiments is hardware that is configured to perform a digital to analog conversion whereby the multiplexed media stream is modulated on an analog signal to be transmitted to the decoder pipeline 300. For example, the transmitter 210 may be configured to create electromagnetic waves modulated by the multiplexed media stream which can be transmitted over air to the receiver 302 in the decoder pipeline 300. Alternatively, or additionally, the transmitter 210 may be configured to produce a signal modulated by the multiplexed media stream which can be transmitted over a hardwire connection between the transmitter 210 and the receiver 302.

Figure 3:
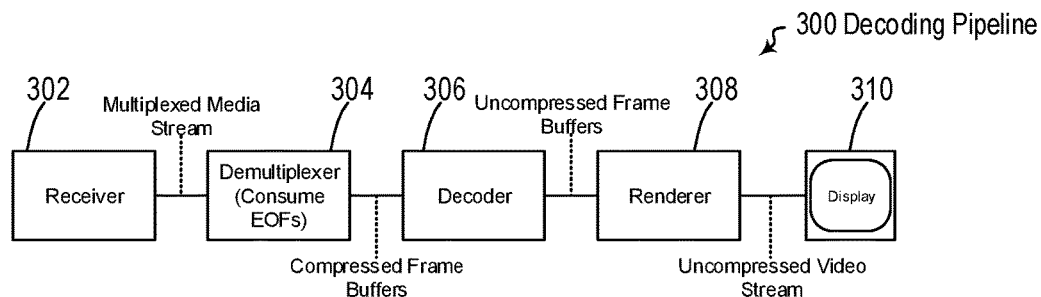
FIG. 3 illustrates a decoding pipeline for rendering video with end-of-frame indicators in the transport stream layer of a multiplexed media stream.

FIG. 3 shows a simplified decoding pipeline 300 separated into a receiver 302, a streaming demultiplexer 304, a decoder 306, a video renderer 308 and a display 310. In the example illustrated in FIG. 3, the decoding pipeline 300 receives multiplexed media streams from the transmitter 210 in FIG. 2. In particular, the receiver 302 receives the multiplexed media stream. The transmitter 210 and receiver 302 may be based on any one of the number of different transmitter and receiver technologies. For example, the transmitter 210 and receiver 302 may be radio frequency transmitters and receivers. Alternatively, or additionally, the transmitter 210 and receiver 302 may be coupled to hardwire communication channels. The benefit of reduced latency effected by the described invention is greater with high-rate communication channels where the transmission time for each encoded video frame can minimized. Lower-rate or bursty communications channels can reduce or negate the potential latency reduction.

The receiver 302 may receive an analog signal that is representative of a digital multiplexed media stream. The receiver 302 can include analog to digital conversion hardware that allows the receiver 302 to convert the analog signals to the multiplexed media stream. The multiplexed media stream is then provided to the demultiplexer 304.

In the example illustrated in FIG. 3, the demultiplexer 304 is configured to consume the end-of-frame indicators to identify when the demultiplexer 304 has received all of the available data for a given video frame in a video stream. The demultiplexer 304 produces as output compressed video frame buffers wherein each video frame buffer comprises all of the data required for an uncompressed video frame in a video stream. Once the demultiplexer has determined that all of the available data for a given video frame buffer has been received at the demultiplexer 304, the demultiplexer 304 can provide the compressed video frame buffer including all of the available data for a video frame to the decoder 306. Note that this can be done before receiving a subsequent video frame buffer from the receiver 302 as the demultiplexer 304 is able to determine that it has all of the available video frame data for a frame of a video stream by consuming an end-of-frame indicator included in the multiplexed media stream. This can have significant time savings as data, i.e., a video frame buffer, can be provided to the decoder 306 quicker for each frame of the video stream than is able to be done in previous decoder pipelines.

The decoder 306 receives a compressed frame buffer including all of the data available for a given frame of a video stream and then decodes the compressed frame buffer to data for an uncompressed video image illustrated herein as an uncompressed frame buffer. The uncompressed frame buffer can be provided, on a per frame basis, to the renderer 308. The renderer 308 is configured to use the uncompressed frame buffer to render an image on the display 310. The preceding acts will be repeated for other compressed frame buffers identified in the multiplexed media stream to create a video output on the display 310 that appears to the user to show motion.

End-of-frame indicators are consumed in the demultiplexer 304, which permit it to identify and output compressed frame buffers to the decoder 306 sooner than possible with video streams that do not contain end-of-frame indicators.

The video component of a multiplexed media stream is composed of distinct video frames to be processed by the decoder 306 prior to output on display 310. The video decoders used in many products require pre-parsing to identify video frame boundaries before being fed, one video frame buffer at a time, into the decoder 306. While it is feasible that some decoders do not require pre-parsing, locating video frame boundaries prior to decoding is a common requirement in decoder implementations.

Adding an end-of-frame indicator to the transport stream allows a decoder that requires pre-parsing to reclaim some of the time it would otherwise spend waiting for the arrival of the next video frame before decoding and displaying a frame.

Video streams used in Intelligence, Surveillance, and Reconnaissance (ISR) applications have distinct requirements from commercial media applications. ISR video is expected to be as near to real-time as possible and carried in an MPEG-2 transport stream or real-time transport protocol (RTP) stream multiplex container. These, and other requirements for ISR media, are defined by the Motion Imagery Standards Board (MISB), with additional requirements defined by customers or specific product capabilities. These requirements are intended to ensure compatibility across different vendor implementations, however they also impose restrictions on the ways vendors can make improvements. This method of adding end-of-frame indicators to video stream protocol headers is fully compliant with all specifications called out by MISB.

Thus, as illustrated in the example above, the end-of-frame indicator may be inserted in such a way that existing decoders can ignore it if they are not expecting it, and can be used to reduce latency in decoders programmed to identify it. In particular, some video stream protocols include data packets in the transport stream layer that allow the developer to insert data into a video stream at the transport stream layer without requiring the data to conform to any predefined requirements. This data is generally ignored by decoders or other hardware that do not include functionality for interpreting the data, but can include information useful to a decoder capable of handling the data.

For example, in some embodiments, a data packet may be inserted into a transport stream layer for a video stream container where the data packet includes an indicator identifying the data packet as including end-of-frame data. In particular, the packet may identify itself as including an end-of-frame indicator. In this way, the demultiplexer, such as demultiplexer 304, that is configured to monitor for such end-of-frame indicators can identify that the configurable data packet includes an end-of-frame indicator that is intended for use with decoders that recognize end-of-frame indicators. In this way, the demultiplexer 304 can provide video frame buffers to the decoder 306 quicker than in previous demultiplexer embodiments that must wait for a start-of-frame indicator in the elementary stream layer for the next video frame before providing the current video frame to the decoder 306.

Some embodiments may use the Private Data field found in the MPEG-2 transport stream specification. Similar techniques can be employed with RTP using either RTP header extensions or profile-specific modifications to the RTP header. Application to other streaming protocols can be accomplished with any protocol specification that provides for custom header content.

Pre-parsing video for only start-of-frame indicators incurs additional latency in the video decoding process. Adding end-of-frame indicators allows video pre-parsing operations to finish sooner and start the decode operation at the end of a video frame instead of having to wait for the start of the next video frame to arrive.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
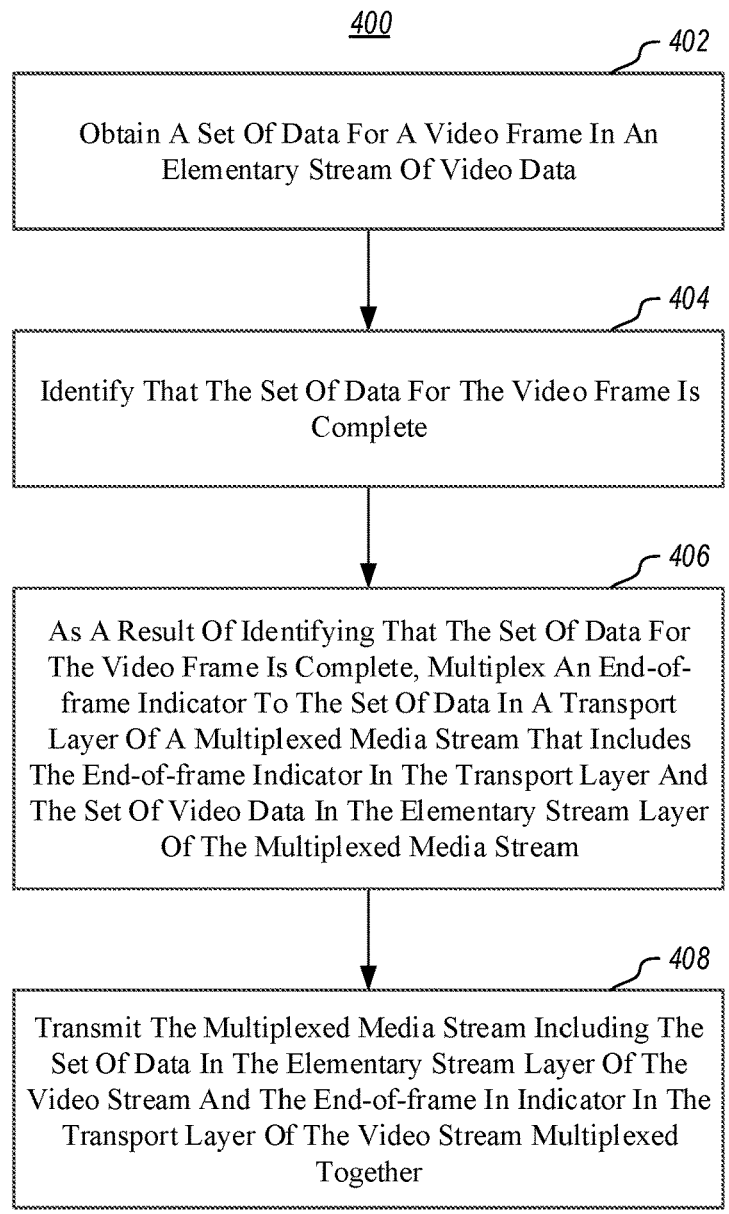
FIG. 4 illustrates a method of processing encoded video data by adding an end-of-frame indicator.

Referring now to FIG. 4, a method 400 is illustrated. The method 400 includes acts for adding an end-of-frame indicator to streaming video data at video frame granularity. The method includes obtaining a set of data for a video frame in a video elementary stream format (act 402). For example, as illustrated in FIG. 2, a multiplexer 208 may receive data in an elementary stream of video data from the encoder 206.

The method 400 further includes identifying that the set of data for the video frame is complete (act 404). This may be accomplished for example, by detecting the end of a burst of data. This may be detected by identifying that the rate at which data is being received has decreased by some threshold amount. Alternatively, or additionally this may be determined by detecting that no video data has been received for some predetermined amount of time. Alternatively, or additionally, this may be determined by identifying a start of frame indicator in a next frame. Alternatively, or additionally, the encoder may process uncompressed video image input and generate encoded video frame buffer output in a single or series of operation(s) and provide a signal when frame encoding is complete. The signal may take the form of, but is not limited to, return from a blocking synchronous function call where the return values are frame buffer size and location in memory, or form of an asynchronous callback where the encoder calls a callback function with encoded frame buffer size and location in memory as function parameters.

As a result of identifying that the set of data for the video frame is complete, the method 400 further includes multiplexing an end-of-frame indicator to the set of data in a transport layer and the set of video data in the elementary stream layer of the multiplexed media stream (act 406). For example, the multiplexer 208 may add an end-of-frame indicator, such as the end-of-frame indicator 104 in the transport layer of the video stream container 100.

The method 400 further includes transmitting the multiplexed media stream including the set of data in the video elementary stream layer of the video stream and the end-of-frame indicator in the transport layer of the video stream multiplexed together (act 408). For example, as illustrated in FIG. 2, the transmitter 210 may transmit the video stream container 100.

Figure 5:
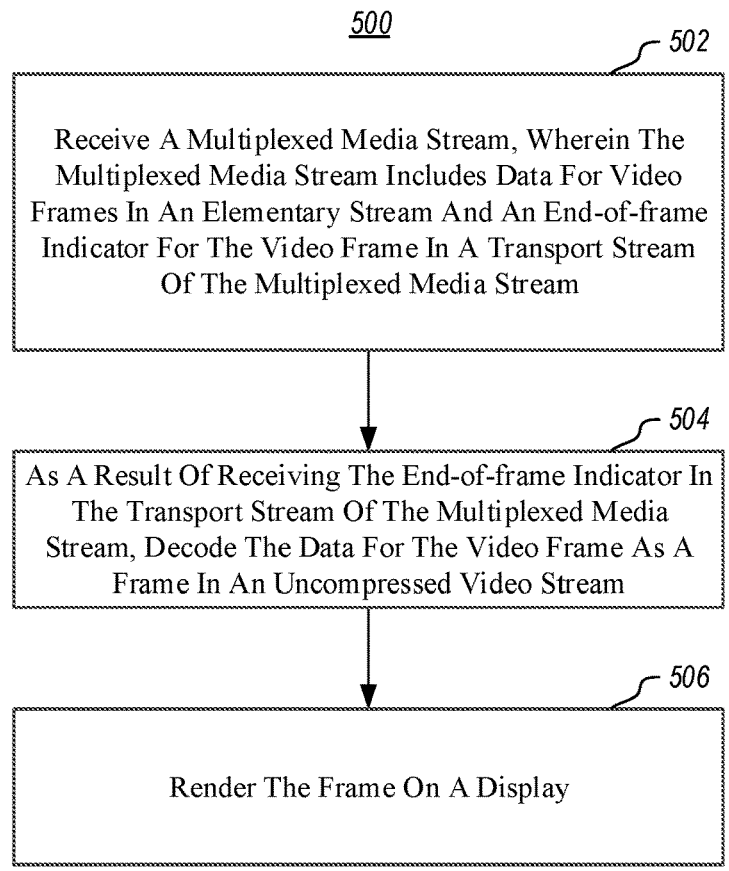
FIG. 5 illustrates a method of decoding and rendering video.

Referring now to FIG. 5, a method 500 is illustrated. The method 500 includes acts for rendering video. The method 500 includes receiving a multiplexed media stream, wherein the multiplexed media stream includes video data for a frame in a video elementary stream and an end-of-frame indicator for the frame in a transport stream (act 502). For example, the receiver 302 may receive a multiplexed media stream in the form of one or more video stream containers, such as the video stream container 100.

The method 500 further includes, as a result of receiving the end-of-frame indicator in the transport stream of the multiplexed media stream, decoding the video data for the frame buffer as a frame in an uncompressed video stream (act 504).

The method 500 further includes rendering the frame on a display (act 506).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired and wireless) to a computer, the computer properly views the connection as a transmission medium. Transmissions media can include a network and/or data links which can be used as a means to carry desired program code in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A video encoding system, the system comprising:
   a capture device, wherein the capture device is configured to group individual frame data into uncompressed frame buffers;
   an encoder coupled to the capture device, wherein the encoder is configured to compress frame data according to a compression algorithm into an elementary stream layer of video data;
   a multiplexer coupled to the encoder, wherein the multiplexer is configured to:
      obtain a set of data for a video frame in an elementary stream layer of video data from the encoder;
      identify that the set of data for the video frame is complete; and
      as a result of identifying that the set of data for the video frame is complete, multiplexing an end-of-frame indicator to the set of data in a transport stream layer of a video stream container into a multiplexed media stream that includes the end-of-frame indicator in the transport stream layer and the set of video data in the elementary stream layer of the multiplexed media stream, wherein the multiplexer is configured to identify that the set of data for the video frame buffer is complete by identifying that no video data has been received for some predetermined amount of time; and
   a transmitter configured to transmit the multiplexed media stream including the set of data in the elementary stream layer of the video stream and the end-of-frame indicator in the transport stream layer of the video stream multiplexed together.

2. The video encoding system of claim 1, wherein the transport stream layer is an RTP transport stream layer.

3. The video encoding system of claim 1, wherein the transport stream layer is an MPEG 2 transport stream layer.

4. The video encoding system of claim 3, wherein the end-of-frame indicator is included in a Private Data field of the MPEG 2 transport stream layer.

5. The video encoding system of claim 1, wherein the multiplexer is configured to identify that the set of data for the video frame buffer is complete by detecting the end of a burst of data.

6. The video encoding system of claim 1, wherein the multiplexer is configured to identify that the set of data for the video frame buffer is complete by identifying that a rate at which data is being received has decreased by a predetermined threshold amount.

7. The video encoding system of claim 1, wherein the multiplexer is configured to identify that the set of data for the video frame buffer is complete by identifying that a start of frame indicator has been received for a next frame.

8. The video encoding system of claim 3, wherein the multiplexer is configured to identify that the set of data for the video frame buffer is complete by means of the encoder providing a signal when frame encoding is complete.

9. A method of adding an end-of-frame indicator to streaming video data at video frame granularity, the method comprising:
   obtaining a set of data for a video frame in an elementary stream layer of video data;
   identifying that the set of data for the video frame is complete, wherein identifying that the set of data for the video frame buffer is complete comprises identifying that no video data has been received for some predetermined amount of time;
   as a result of identifying that the set of data for the video frame is complete, multiplexing an end-of-frame indicator to the set of data in a transport stream layer of a multiplexed media stream that includes the end-of-frame indicator in the transport stream layer and the set of video data in the elementary stream layer of the multiplexed media stream; and
   transmitting the multiplexed media stream including the set of data in the elementary stream layer of the video stream and the end-of-frame indicator in the transport stream layer of the video stream multiplexed together.

10. The method of claim 9, wherein the transport stream layer is an RTP transport stream layer.

11. The method of claim 9, where in the transport stream layer is an MPEG 2 transport stream layer.

12. The method of claim 11, wherein the end-of-frame indicator is included in a Private Data field of the MPEG 2 transport stream layer.

13. A video encoding system, the system comprising:
   a capture device, wherein the capture device is configured to group individual frame data into uncompressed frame buffers;
   an encoder coupled to the capture device, wherein the encoder is configured to compress frame data according to a compression algorithm into an elementary stream layer of video data;
   a multiplexer coupled to the encoder, wherein the multiplexer is configured to:
      obtain a set of data for a video frame in an elementary stream layer of video data from the encoder;
      identify that the set of data for the video frame is complete, wherein the multiplexer is configured to identify that the set of data for the video frame buffer is complete by identifying that a rate at which data is being received has decreased by a predetermined threshold amount; and
      as a result of identifying that the set of data for the video frame is complete, multiplexing an end-of-frame indicator to the set of data in a transport stream layer of a video stream container into a multiplexed media stream that includes the end-of-frame indicator in the transport stream layer and the set of video data in the elementary stream layer of the multiplexed media stream; and
   a transmitter configured to transmit the multiplexed media stream including the set of data in the elementary stream layer of the video stream and the end-of-frame indicator in the transport stream layer of the video stream multiplexed together.

14. The video encoding system of claim 13, wherein the transport stream layer is an RTP transport stream layer.

15. The video encoding system of claim 13, wherein the transport stream layer is an MPEG 2 transport stream layer.

16. The video encoding system of claim 13, wherein the end-of-frame indicator is included in a Private Data field of the MPEG 2 transport stream layer.

17. A method of adding an end-of-frame indicator to streaming video data at video frame granularity, the method comprising:
   obtaining a set of data for a video frame in an elementary stream layer of video data;
   identifying that the set of data for the video frame is complete, wherein identifying that the set of data for the video frame buffer is complete is performed by identifying that a rate at which data is being received has decreased by a predetermined threshold amount;

as a result of identifying that the set of data for the video frame is complete, multiplexing an end-of-frame indicator to the set of data in a transport stream layer of a multiplexed media stream that includes the end-of-frame indicator in the transport stream layer and the set of video data in the elementary stream layer of the multiplexed media stream; and transmitting the multiplexed media stream including the set of data in the elementary stream layer of the video stream and the end-of-frame indicator in the transport stream layer of the video stream multiplexed together.

18. The method of claim 17, wherein the transport stream layer is an RTP transport stream layer.

19. The method of claim 17, where in the transport stream layer is an MPEG 2 transport stream layer.

20. The method of claim 19, wherein the end-of-frame indicator is included in a Private Data field of the MPEG 2 transport stream layer.

* * * * *